Nov. 17, 1936.  F. L. O. WADSWORTH  2,060,912
BRAKE
Filed July 27, 1932  3 Sheets-Sheet 3
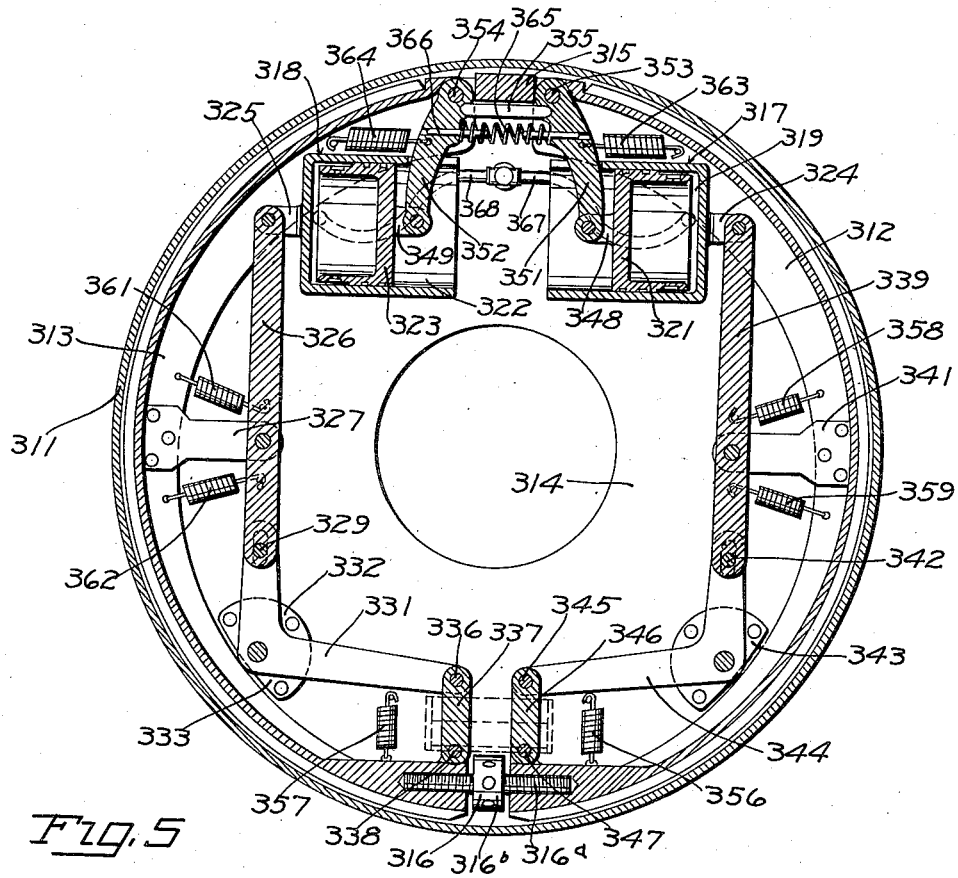
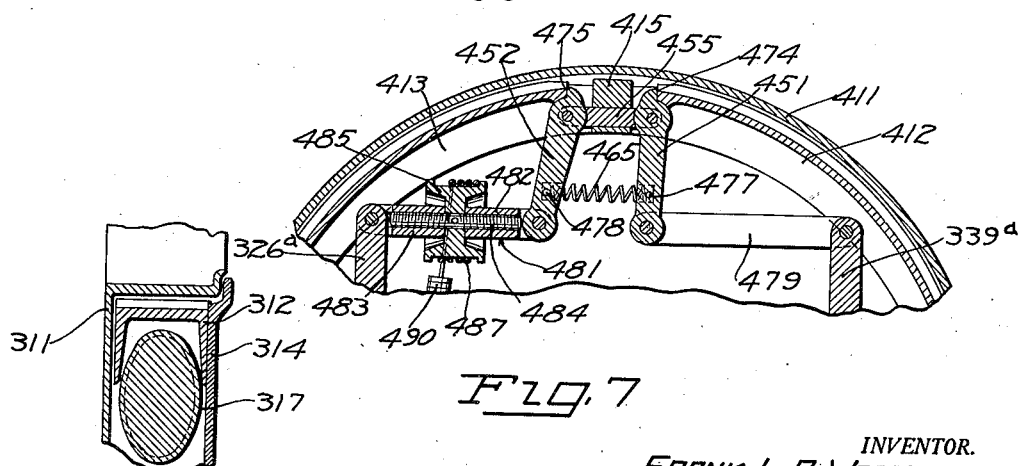
INVENTOR.
FRANK L. O. WADSWORTH
BY
Jerome R. Cox
ATTORNEY.

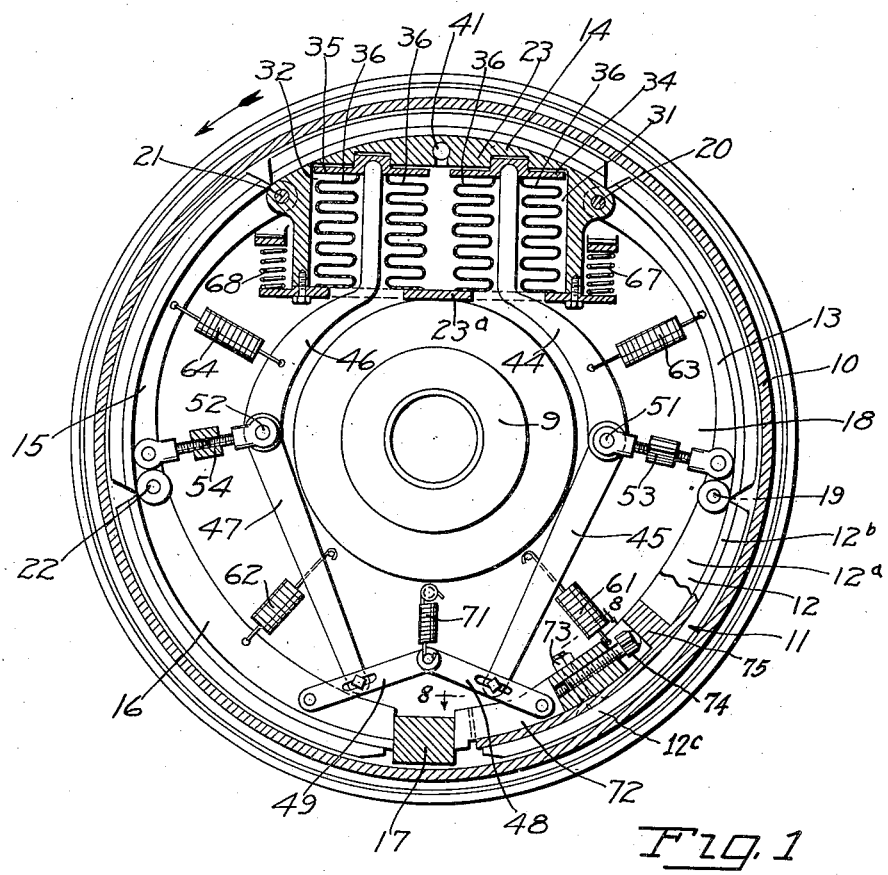

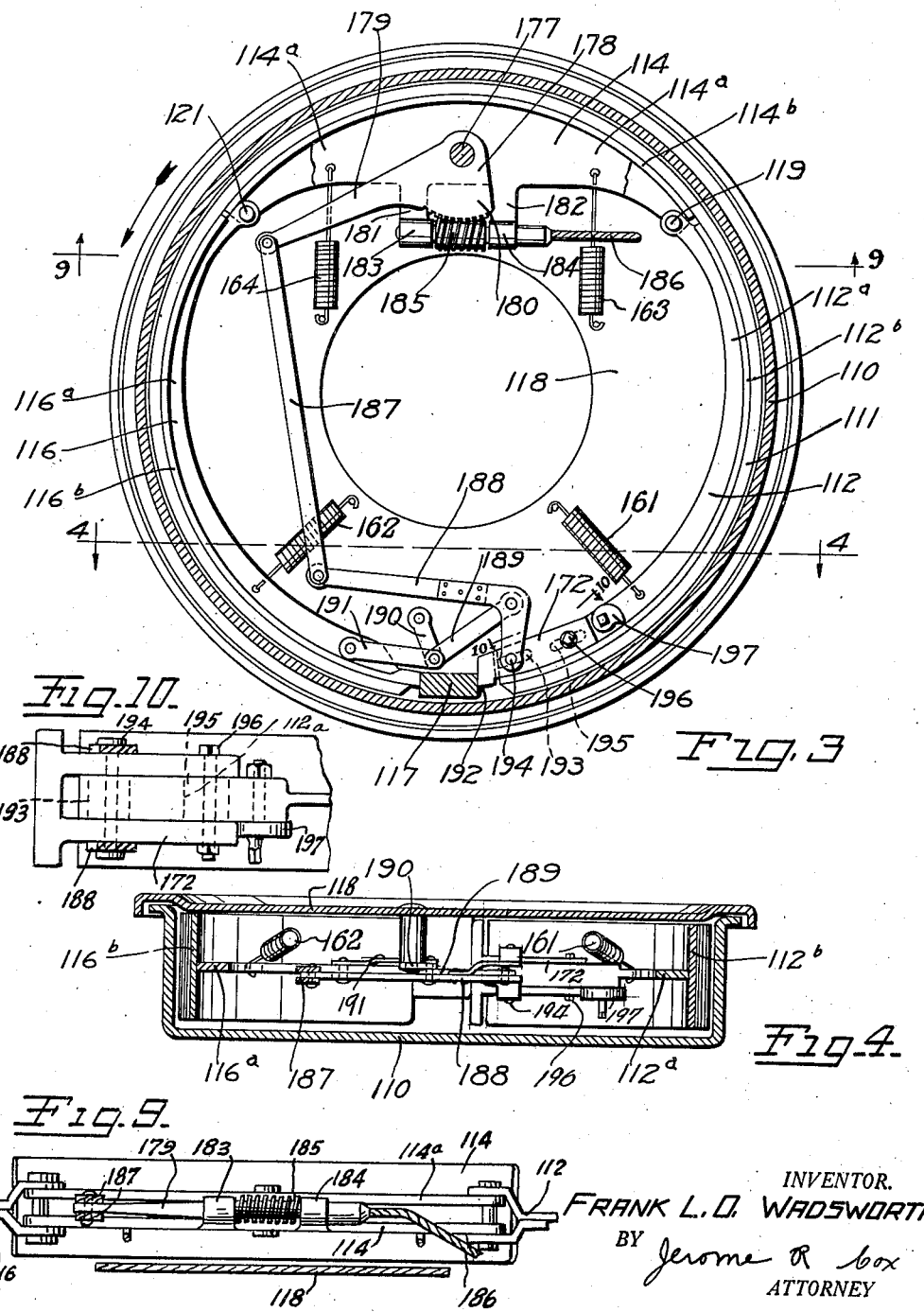

Patented Nov. 17, 1936

2,060,912

UNITED STATES PATENT OFFICE 2,060,912

BRAKE

Frank L. O. Wadsworth, Pittsburgh, Pa., assignor to Bendix Aviation Corporation, South Bend, Ind., a corporation of Delaware Application July 27, 1932, Serial No. 625,113

7 Claims. (Cl. 188—152)

This invention relates to brakes, and more particularly to improved means for expanding an internal friction member against the inner periphery of the brake drum.

One of the objects of my invention is the provision of means for concurrently or progressively exerting an applying force at a plurality of circumferentially spaced intervals on the expansion member in order to move different portions thereof into controlled engagement with the brake drum member, and thereby regulate the servo or self energizing action of the frictionally engaged surfaces.

A further object of the improvements is to secure an automatically controllable regulation of the engagement pressure, and the resultant braking torque at different parts of the relatively movable brake elements.

Another object of this invention is to provide special means for moving expansion members, or elements, into contact with the cooperating drum surface in such manner that the applying force acts at diametrally opposite points upon the said member.

A further and more specific object of the invention is to provide a linkage whereby fluid pressure may be transmitted to an internally expansible friction member in the manner and for the purposes above indicated.

A further object is to minimize the click or noise resulting from the application of the brake elements.

Special features of the invention relate to the use of oval or elliptical fluid pressure cells for applying the friction member to the drum; the use of linkage adapted to transmit this fluid pressure to three, four, five, or more, separate and distinct points on the said member; and to the use of a cable operated capstan wheel for applying force to move the expansible friction member into contact with the brake drum.

Further objects and features of the invention will be apparent after a reading of the subjoined specification and claims and after a consideration of the attached drawings, in which:

Figure 1 is a sectional elevation of a drum, an internal friction retarding member therefor and a mechanism for actuating the friction member, all constructed according to my invention;

Figure 2 is a view in horizontal section showing the fluid pressure motor used for applying the friction element;

Figure 3 is a view similar to Figure 1 showing a modified form of actuating mechanism;

Figure 4 is a sectional view taken substantially on the line 4—4 of Figure 3;

Figure 5 is a sectional elevation, similar to Figure 1 showing the brake drum, the friction members, and the friction applying means of a modification;

Figure 6 is a sectional view through one of the fluid pressure motors used for applying the friction element to the drum;

Figure 7 is a fragmentary sectional view of a modified form of brake applying mechanism.

Figure 8 is an enlarged sectional view taken substantially on the line 8—8 of Figure 1;

Figure 9 is a sectional view taken substantially on the line 9—9 of Figure 3; and Figure 10 is an enlarged sectional view taken substantially on the line 10—10 of Figure 3.

Referring particularly to the drawings, I have shown in Figure 1, a wheel mounted on a spindle 9 and provided with a rotating brake drum 10 which is adapted to be engaged by a flexible friction member or band generally designated 11. This band comprises a plurality of shoe elements such as 12, 13, 14, 15, and 16, each of the shoe elements 12, 13, 15, and 16 comprising a pair of parallel web sections and a rim section integral therewith, the rim section having secured thereto a segment of lining adapted to contact directly with the drum. For instance, the shoe element 12 comprises webs 12a, a rim 12b and a lining segment 12c. Interposed between the ends of the shoe elements 12 and 16 is an anchor 17 which is secured to a backing plate 18.

The shoe elements 12, 13, 14, 15, and 16 are flexibly connected to each other, as at 19, 20, 21, and 22, and are adapted to move the lining segments into contact with the drum 10. Shoe element 14 is provided with an inwardly projecting portion 23 which serves also as a casing for a fluid pressure actuating device which will be hereinafter described more fully. The parts 14 and 23 may be made in the form of a single casting, which is provided with a pair of connected oval recesses 31 and 32. Within these recesses there are positioned heads 34 and 35 which are connected by the flexible sylphon cells, 36, with the cap 23a that is secured to the inner face of the member 14—23, so as to form a fluid tight compartment for the movable heads 34 and 35. Shoe element 14 with its inwardly projecting portion 23 forms a fluid motor for actuating the brake. This element and the motor are not secured to the backing plate but are supported only by the springs substantially in the same way that the other shoes are supported. Fluid is supplied to this compartment through a passage 41 which is connected by a flexible hose 40 to a suitable source of fluid pressure.

Any pressure applied to the heads 34—35 is transmitted through two pairs of curved arms 44—45 and 46—47, to toggle links 48—49, which are coupled to the adjacent shoe sections 12 and 16. The arms 44 and 45, and 46 and 47, may be either flexibly coupled, or rigidly coupled to each other by the pins 51 and 52 respectively, but in either case these points of juncture are pivotally connected to the adjacent shoe sections 13 and 15, by the two adjustable turn-buckle links 53 and 54.

Inasmuch as the central shoe member 14—23 is secured to the central portion of the band, and can move freely both with respect to the drum 10 and with respect to the backing plate 18, the reaction on said member 14—23 by reason of a fluid pressure exerted on the heads 34 and 35 forces said member radially outward into engagement with the drum 10; while the pressure on the heads 34 and 35 acts through the linkage connections 44—45, 46—47, 53—54, and 48—49 to cooperatively expand the shoe sections 12, 13, 15, and 16. The brake band or ring 11 is thus forced against the drum at five circumferentially spaced intervals. The resultant expansion of the ring separates the ends thereof, and moves one end thereof away from the anchor 17, the direction of this movement being determined by the direction of rotation of the drum at the time of brake application.

Means are provided for radially retracting or contracting the connected shoe lining elements, which comprise the tension springs 61, 62, 63, and 64, which act respectively on the shoe elements 12, 16, 13, and 15; the compression springs 67 and 68 which act on the shoe section 14; and the tension spring 71, which acts on the toggle links 48—49. By varying the relative strength of these springs, the order or sequence of the application of different portions of the band to the drum may be adjusted and regulated. This adjustment is preferably such that the central portions of the friction element 11 (i. e., that part formed by the shoe section 14) is first brought into engagement with the revolving drum surface, but any other desirable sequence of contact may be readily secured, and it is evident that by a proper regulation of the retracting spring tensions, substantially instantaneous engagement of all parts of the braking surfaces can be obtained.

The relative degree of radial thrust that is exerted respectively on the shoe section 14 and on the shoe sections 13 and 15 may be regulated by the adjustment of the length and the radial inclination of the links 53 and 54; and the cooperative action of the brake applying mechanism on the shoe sections 12 and 16 may be also varied and controlled by the angular relationship of the toggle link elements 48 and 49 and by adjustment of the ends of the arms 46 and 47 in the slots in the links 48 and 49. These adjustments enable me to readily control the relative degree of radial pressure, and the corresponding amount of braking torque, that is exerted in, and by, successive portions of the brake ring.

In order to adjust the friction element for lining wear, I provide a separate end member 72 which is slidably mounted between the side flanges or webs 12a and the rim 12b of the shoe 12. The member 72 is clamped to this shoe by a pair of bolts 73, whose heads are engaged by the rim 12b and which pass through slots in the head of the said member. This head is formed with a tapped recess into which there is inserted an adjustable screw 74 that engages with a cross web 75 on the adjacent portion of the shoe 12. This affords a means by which the relative position of the parts 72 and 12 may be easily varied to maintain any desired clearance between the braking surfaces in the off position, without altering the operative relationship between the interconnected elements of the brake ring and the applying or spreading mechanism therefor. The adjustment is accomplished by loosening the nuts of the bolts 73 and then screwing the screw 74 inward or outward as desired.

In the use of this form of my invention, a suitable fluid (e. g. oil) is forced through the conduit 40, into the chamber 31—32, and causes the heads 34 and 35 to move inwardly relative to the shoe element 14; and thus, through the links 44, 45, 46, 47, 48, 49, 53, and 54, and through the reaction on the shoe element 14 itself, expands different circumferential portions of the band against the adjacent portions of the drum, in any desired and predetermined order as may be predetermined when the brake is assembled; and to any desired and preadjusted degree as may also be predetermined when the brake is assembled.

In the embodiment of my invention shown in Figures 3 and 4, there are provided only three series connected shoe elements (instead of five) for expanding a substantially continuous lining or friction band 111 into contact with the drum 110. The shoe element 112, comprises a web 112a and a rim 112b; a second shoe 114 comprises a rim 114b and two side flanges 114a—114a; and a third shoe 116 comprises a web 116a and a rim 116b, the latter corresponding substantially to the web 112a and the rim 112b. The rims 112b, 114b, and 116b, all cooperate to support the band 111 which forms a substantially continuous friction braking element. The band 111 is secured to the rims of the shoes in any desired manner. For example, the band may be riveted to the rims of the several shoes. The shoe elements 112 and 114, and the shoe elements 114 and 116 are pivotally connected at 119 and 121, and the free end of the shoe 116 is adapted to engage directly with anchor 117.

Means are provided to expand the friction member 111 through force exerted at three circumferentially spaced points. The shoe 114 carries a sector gear 180, and an operating mechanism therefor, by means of which this force is applied to the three shoes 112, 114, and 116 and to the friction band member mounted thereon. The sector gear 180 is rotatably mounted on a cross pin 177 which is secured in the side flanges 114a of the shoe 114, and is provided with an extension arm 179. The side flanges 114a also carry a pair of cross brackets 181 and 182, which form bearings 183 and 184 through which a worm screw 185 extends. The worm screw is actuated by means of a flexible shaft 186, and by its rotation serves to rock the gear 180 and the lever arm 179 on the cross pin 177. The outer end of the lever 179 is connected to the long arm of a bell crank lever 188 by a pair of links 187.

The knee and short arm portion of the lever 188 is forked, and is pivotally connected at its knee to a single link 189 which is, in turn, coupled to the shoe 116 by the double link 191. The pivotally connected ends of the links 189—191, are supported by the outer end of a rocking guide link 190 that is carried by the backing plate 118.

The outer forked end of the bell crank lever 188 carries a cross pin 194 by which it is pivotally secured to a slotted or U shaped block 172, that is adjustably mounted on the web 112a of the shoe element 112, and is adapted to engage, at 192, with the anchor 117. The web 112a, is provided with a slot 193 through which the pin 194 extends; and is also provided with a second slot, 195, to receive a cross bolt 196 that serves to clamp the legs of the U shaped block 172 against the sides of the web 112a. A rotatable cam 197 is mounted on the web 112a and is arranged to bear against the inner end of the movable member 172, for adjusting and maintaining it in any selected position.

In the operation of this brake, rotation of the flexible shaft 186 revolves the worm 185 and rocks the operating members 179—180 in a counter-clockwise direction on the cross pin 177. This action will result in relatively opposite movements of the shoe 114 and the linkage elements 187—188, which will tend respectively to radially expand the center and the ends of the brake ring member 111. This expanding movement is resisted by the tension of the springs—and by altering these tensions, the order or sequence of the engagement of different parts of the expanding members with the brake drum may be preadjusted and controlled in the manner previously explained. Rotation of the wheel holds the end of one of the shoe elements 172 or 116 to contact with the anchor 117 and thus causes a braking force to be exerted upon the drum.

In Figures 5 and 6, I have shown a brake drum 311, within which there are positioned the brake shoes 312 and 313; these shoes cooperating to form a band or ring member that is adapted to be moved into contact with the drum 311 for braking the automobile. Positioned adjacent to and substantially closing one side of the drum 311 is a backing plate 314, to which is secured an anchor 315 interposed between the shoes 312 and 313. The shoes 312 and 313 are connected by an adjusting device 316 comprising a screw 316a having its ends oppositely threaded and an operating wheel 316b therefor.

Means are provided to move the shoes 312 and 313 into contact with the drum. This means includes a pair of fluid pressure motors 317 and 318. The motor 317 comprises a cylinder 319 and a piston 321 movable therein; and the motor 318 likewise comprises a cylinder 322 and a movable piston 323. The cylinders 319 and 322 are provided with lugs 324 and 325. Pivotally connected to the lug 325 is a lever 326 which is rotatably mounted at an intermediate point in its length on a bracket 327 secured to the shoe 313. The opposite end of the lever 326 is connected by a pin and slot connection, 329 to a bell crank lever 331, which is rotatably supported on a bracket 332 secured to the backing plate 314 as at 333. The opposite end of the bell crank lever 331 is pivotally coupled at 336 to a compression link 337 which has its opposite end pivotally connected to the shoe 313 as at 338.

The lug 324 of the cylinder 319 is connected, at 347, to the shoe 312 by the levers and links 339, 344, and 346 which are similar in all respects to the linkage elements 326, 331, and 337.

The pistons 321 and 323 are provided with lugs 348 and 349 respectively. Connected to the lugs 348 and 349 are levers 351 and 352, whose upper ends are pivotally mounted between the side flanges of the shoes 312 and 313. Interposed between the levers 351 and 352 is a compression bar 355, the ends of which serve as fulcrum points for the levers 351 and 352.

As is shown most clearly in Figure 6, the fluid motors 317 and 318 are oval in shape and the pistons fitting in the cylinders are correspondingly oval in shape.

Connected to the backing plate 314 and to the lower ends of the shoes 312 and 313 are a pair of springs 356 and 357 which tend to pull these ends away from the drum into their normal inactive position. A second pair of springs 358 and 359, which are connected to the shoe 312 adjacent its central point and to the backing plate 314 aid in the retraction of the shoe 312; and a third set of springs 361 and 362, similarly connected to the shoe 313 and to the backing plate 314 assist in the retraction of this part of the brake ring. Another set of tension springs, 363 and 364, which interconnect the shoes 312 and 313 and the levers 351 and 352, and a compression spring 365 which is interposed between the levers 351 and 352, also aid in normally maintaining the parts in the off position.

In the operation of this form of my improved brake, fluid introduced into the cylinders 319 and 322, through conduits 367 and 368, cause the pistons 321 and 323 to move toward each other and the cylinders 319 and 322 to move away from each other. The inward movement of the pistons cause a rotation of the levers 351 and 352, and the pivotal engagement of these levers with the ends of the compression member 355 will, in turn, produce a separation of the adjacent ends of the brake shoes 312 and 313. The cylinders 319 and 322 react in opposite directions and exert a rotative thrust on the levers 339 and 326, that tends to move the intermediate portions of the shoes 312 and 313 toward the drum, at points adjacent to the brackets 327 and 341. The rotative thrust on the levers 339 and 326 also exerts a turning moment on the bell crank levers 344 and 331; and this effect is transmitted, through the links 337 and 346 to the lower ends of the shoes 312 and 313. Any fluid pressure action on the cylinder-piston elements 319—321, and 322—323, will thus result in applying an expanding force to the brake shoes at six spaced points. The sequence of application of the forces to these different parts of the brake ring may be regulated as desired, by proper proportioning of the springs 356, 357, 358, 359, 361, 362, 363, 364, and 365; but I prefer that the spring tensions shall be so adjusted that the portion of the friction member which is opposite the anchor will be first engaged with the drum, and that the portions which are adjacent to the anchor will be the last to be brought into contact therewith. When this is done the following, or heel end of the brake ring will always remain in fixed engagement with the anchor member—for both directions of drum rotation—and all "slamming" or "knocking" of the parts will be eliminated.

In the modification of my invention shown in Figure 7, the levers 451 and 452, instead of being pivotally connected to the ends of the brake shoes 412 and 413, are pivotally connected to a bar 455 and have their upper ends in abutting engagement with the adjacent ends of the shoes, as at 474 and 475 respectively. Interposed between the levers 451 and 452 is a compression spring 465 maintained in position by being secured to the levers 451 and 452 as at 477 and 478. The lower ends of the levers 451 and 452 are respectively connected to the levers 339a and 326a by means of the links 479 and 481. The remainder of the brake applying linkage is the same as that shown in Figure 5.

In this last described embodiment of my invention, the link 481 also serves as a means for actuating the brake applying linkage, and thereby moves the friction member into engagement with the drum. As shown in Figure 7, the link 481 comprises a pair of sleeves 482 and 483 which are provided with right and left hand internal threads, and a cooperating screw 484, which engages these threaded sleeves and serves, by its rotation, to move them away from or toward one another; and thereby change the effective length of the link. This screw is rotated by a capstan drum 485, which is pinned or otherwise properly secured to the central portion of the screw 484, and which is engaged by a cable 487 that is wrapped several times around this drum and is led therefrom to some suitable operating lever on the frame of the automobile.

In the operation of this form of my invention an applying movement of the operating lever will rotate the drum in such direction as to move the sleeves 482 and 483 away from each other and thereby bring different circumferential portions of the brake ring assembly, either successively or concurrently into operative engagement with the brake drum, in the same manner as this result is accomplished in the previously described construction (Figure 5). When the operating pull is released or relieved the parts are returned to the off position shown in Figure 7, by a system of retraction springs similar to those indicated by the reference numerals 356, 357, 358, 359, 361, 362 of Figure 5; and by a supplemental spring 490 that is attached to the free end of the cable 487.

It is to be understood that the above described embodiments of my invention are for the purpose of illustration only and various changes may be made therein without departing from the spirit and scope of the invention.

I claim:

1. A brake comprising a drum; a plurality of shoes including a central shoe, a plurality of intermediate shoes pivotally connected to the ends of said central shoe, and a pair of end shoes each pivotally connected to the outer end of one of said intermediate shoes; an anchor positioned between the outer ends of said end shoe; a fluid motor carried by said central shoe; a pair of actuating links each connected at one end to one of said end shoes and interconnected at their opposite ends; a plurality of adjustable actuating links each pivotally connected to one of said intermediate shoes; a pair of struts each operatively connected to said fluid motor at one end and each pivotally connected at its opposite end to an intermediate point of one of said first mentioned actuating links, pivotal connections between said struts and said adjustable actuating links at points between the ends of said struts; and resilient means connected to said shoes and to said links for withdrawing said shoes from drum contact.

2. A brake comprising a drum; a plurality of shoes including a central shoe, a plurality of intermediate shoes pivotally connected to the ends of said central shoe, and a pair of end shoes each pivotally connected to the outer end of one of said intermediate shoes; an anchor positioned between the outer ends of said end shoes; a fluid motor carried by said central shoe and linkage whereby said fluid motor actuates said shoes; and resilient means connected to said shoes and to said links for withdrawing said shoes from drum contact.

3. A brake comprising a drum; a plurality of shoes; a fluid motor carried by one of said shoes; a pair of actuating links each connected at one end to one of said shoes and interconnected at their opposite ends; a plurality of adjustable actuating links each pivotally connected to one of said shoes; a pair of struts each operatively connected to said fluid motor at one end and each pivotally connected at its opposite end to an intermediate point of one of said first mentioned actuating links, pivotal connections between said struts and said adjustable actuating links at points between the ends of said struts; and resilient means connected to said shoes and to said links for withdrawing said shoes from drum contact.

4. A brake comprising a drum; a plurality of shoes including a central shoe, a plurality of intermediate shoes pivotally connected to the ends of said central shoe, and a pair of end shoes each pivotally connected to the outer end of one of said intermediate shoes; an anchor positioned between the outer ends of said end shoes; a fluid motor carried by said central shoe and comprising a casing, a plurality of pistons in said casing, and a plurality of flexible diaphragms each associated with one of said pistons; a pair of actuating links each connected at one end to one of said end shoes and interconnected at their opposite ends; a plurality of adjustable actuating links each pivotally connected to one of said intermediate shoes; a pair of struts each positioned on opposite sides of the center of rotation of said drum and each operatively connected to one of the pistons in said fluid motor at one end and each pivotally connected at its opposite end to an intermediate point of one of said first mentioned actuating links, pivotal connections between said struts and said adjustable actuating links at points between the ends of said struts; and resilient means connected to said shoes and to said links for withdrawing said shoes from drum contact.

5. A brake comprising a drum; a plurality of shoes including a central shoe, a plurality of intermediate shoes pivotally connected to the ends of said central shoe, and a pair of end shoes each pivotally connected to the outer end of one of said intermediate shoes; an anchor positioned between the outer ends of said end shoe; a fluid motor carried by said central shoe and comprising a casing, a plurality of pistons in said casing, and a plurality of flexible diaphragms each associated with one of said pistons and linkage whereby said fluid motor actuates said shoes; and resilient means connected to said shoes and to said links for withdrawing said shoes from drum contact.

6. A brake comprising a drum; a plurality of shoes; a fluid motor carried by one of said shoes and comprising a casing, a plurality of pistons in said casing, and a plurality of flexible diaphragms each associated with one of said pistons; a pair of actuating links each connected at one end to one of said shoes and interconnected at their opposite ends; a plurality of adjustable actuating links each pivotally connected to one of said shoes; a pair of struts each positioned on opposite sides of the center of rotation of said drum and each operatively connected to one of said pistons of said fluid motor at one end and each pivotally connected at its opposite end to an intermediate point of one of said first mentioned actuating links, pivotal connections between said struts and said adjustable actuating links at points between the ends of said struts; and resilient means connected to said shoes and to said links for withdrawing said shoes from drum contact.

7. A brake comprising a drum; a plurality of shoes including a central shoe, a plurality of intermediate shoes pivotally connected to said central shoe, and a pair of end shoes each pivotally connected to the outer end of one of said intermediate shoes; an anchor positioned between the outer ends of said end shoe; a fluid motor carried by said central shoe; a pair of actuating links each connected at one end to one of said end shoes and interconnected at their opposite ends; a plurality of adjustable actuating links each pivotally connected to one of said intermediate shoes; a pair of struts each operatively connected to said fluid motor at one end and each pivotally connected at its opposite end to an intermediate point of one of said first mentioned actuating links, pivotal connections between said struts and said adjustable actuating links at points between the ends of said struts; and resilient means connected to said shoes, and said links for withdrawing said shoes from drum contact, one of said end shoes being provided with a slot adjacent its outer end, an adjustable element positioned in said slot formed with a threaded bore and a bolt screwed into said bore and bearing on a portion of said shoe.

FRANK L. O. WADSWORTH.